United States Patent [19]

Cella et al.

[11] 3,753,739

[45] Aug. 21, 1973

[54] LOW CALORIE DRY SWEETENER COMPOSITION

[75] Inventors: John A. Cella, Lake Forest; William H. Schmitt, Elmhurst, both of Ill.

[73] Assignee: Alberto-Culver Company, Melrose Park, Ill.

[22] Filed: Nov. 5, 1970

[21] Appl. No.: 87,303

[52] U.S. Cl. .............................................. 99/141 A
[51] Int. Cl. ................................................ A23l 1/26
[58] Field of Search .................. 99/141, 141 A, 28, 99/78; 260/112.5

[56] References Cited
UNITED STATES PATENTS

| | | | |
|---|---|---|---|
| 3,475,403 | 10/1969 | Mazur et al. | 260/112.5 |
| 3,325,296 | 6/1967 | Braaten | 99/141 |
| 3,560,343 | 2/1971 | Armbruster et al. | 195/31 |
| 3,320,074 | 5/1967 | Gebhardt | 99/141 |

*Primary Examiner*—Raymond N. Jones
*Attorney*—Wallenstein, Spangenberg, Hattis and Strampel

[57] ABSTRACT

Pulverulent free-flowing water-soluble low calorie sweetener compositions having the general appearance of sucrose are produced by preparing a strong aqueous solution or slurry of an aspartyl-phenylalanine methyl ester sweetener at a relatively low temperature, admixing therewith a heated aqueous starch hydrolysate having a D.E. of zero to 20, and promptly thereafter, feeding the mixture to the preheater of a spray drier and thereupon spray drying said mixture to provide an expanded dry pulverulent composition containing a low moisture content.

8 Claims, No Drawings

LOW CALORIE DRY SWEETENER COMPOSITION

This invention relates to dry, low calorie sweetener compositions which contain dipeptide sweeteners exemplified particularly by aspartyl-phenylalanine methyl ester. This latter compound is a white, crystalline powder which possesses a sweet taste, being capable of replacing 100 to 200 times its weight of sucrose. Such dipeptide sweeteners are disclosed in U.S. Pat. No. 3,475,403, being shown to be represented by the formula

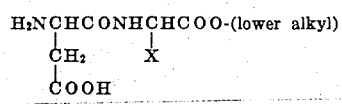

wherein X is selected from the group of radicals consisting of

and

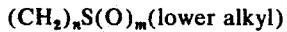

R being a member of the group consisting of hydrogen and a lower alkyl radical, m an integer selected from the group consisting of 0 and 2 and n a positive integer less than three.

While such dipeptide sweeteners can, of course, be utilized as such as sweeteners for beverages such as coffee, tea and allied purposes, it has been suggested, as is set forth, for instance, in the aforesaid U.S. Patent, that they can be employed in the form of powders, tablets, syrups, etc. and in conjunction with liquid or solid carriers such as water, glycerol, starch, sorbitol, salt, citric acid and, generally, other non-toxic substances.

The aforesaid dipeptide sweeteners have been found to be relatively unstable compounds. Thus, for example, aspartylphenylalanine methyl ester undergoes decomposition or change relatively readily under certain conditions to form a diketopiperazine, causing a significant diminution in sweetening power. When aspartyl-phenylalanine methyl ester is admixed with water, it does not dissolve readily but tends to lump, said lumps dissolving with some difficulty. When said ester is tableted in conventional manners, the resulting tablets do not dissolve readily in water. Even when said ester is admixed with a major proportion of a pulverulent carrier, such as powdered lactose, it does not go into solution in water or aqueous media very readily. The foregoing considerations have presented substantial problems in preparing the said dipeptide sweeteners in a form such that advantage can be effectively taken of their high sweetening properties while, at the same time, avoiding as much as is reasonable possible the problems inherent in the solubility and instability characteristics of said dipeptides.

The present invention is based, in part, upon incorporating said dipeptide sweeteners into certain starch hydrolysate carriers, namely, those having a dextrose equivalent (D.E.) of zero to 20, preferably zero to 12, coupled, however, with certain other critical conditions of operation, hereafter described, whereby the aforesaid problems are, to a substantial extent, overcome.

It may be pointed out that it is recognized that it has heretofore been known, as shown in U.S. Pat. Nos. 3,320,074 and 3,325,296, to employ certain starch hydrolysates in the production of sweetener compositions in which the sweetener is saccharin or cyclamates or mixtures thereof. In the first of these two patents, an aqueous solution of a water-soluble dextrin, having a D.E. of about zero, is subjected to pressure, aerated and then spray dried, the final product having a bulk density not exceeding about 0.15 g/cc and having a caloric content in the range of about 2.7 to less than 5.5 calories per level teaspoon. In the second of said patents, an aqueous solution of a water-soluble starch hydrolysate, having a D. E. in excess of 13 but not more than 28, and a noncaloric artificial sweetener such as saccharin and/or cyclamates is subjected to vacuum drying as, for instance, on a vacuum drum dryer. The resulting products, after milling and classification, have caloric contents as low as about 3 calories per level teaspoon. The procedures described in the said patents are ineffective to produce satisfactory low calorie products simply by substituting the dipeptide sweeteners for saccharin and/or cyclamates. This is because the dipeptide sweeteners have certain instability characteristics which are not possessed by saccharin or the cyclamates, and, under the manufacturing procedures taught by said patents, and dipeptide sweeteners break down to a very substantial extent and their sweetening efficacy is markedly impaired.

As has been stated above, only those starch hydrolysates which have a D. E. of zero to 20 are satisfactory for use in the practice of our present invention. In this connection, it has been found that the D. E. of the startch hydrolysates is essentially directly proportional to the instability of the starch hydrolysatedipeptide composition in dry form as well as in solution. If starch hydrolysates having a D.E. in excess of about 20 are sought to be used, the rate of destruction of the dipeptide sweetener is unduly rapid, in the process of preparing a dry pulverulent sweetener composition, as well as in the said dry pulverulent compositions on standing under normal storage or shelf conditions, and on incorporation of said compositions into hot aqueous drinks such as coffee and tea.

In the practice of our invention, an aqueous solution or slurry is made containing, advantageously, only a dipeptide sweetener of the type disclosed in the aforesaid U.S. Pat. No. 3,475,403, particularly aspartyl-phenylalanine methyl ester. Where a solution is made up, it is desirably concentrated but it may be of somewhat lesser concentration, preferably, however, not substantially less than 75 percent of the amount which can be held in solution at the temperature involved. However, since aspartyl-phenylalanine methyl ester is not overly soluble in water, being about 0.5 percent at 25° C, about 1.7 percent at 50° C and about 5 percent at 75° C, it is desirable to make a slurry of said ester in water wherein the slurry contains from about 8 to 20 percent of said ester. This solution or slurry is made in the cold and, in general, the temperature thereof should not exceed 40° C, better still should not exceed 30° C, and, more advantageously, should be about room temperature or 15° C or below. It is especially desirable that such solution or slurry should be made up as shortly as possible before it is admixed with the starch hydrolysate solution, as described below.

A separate aqueous solution is made up of the aforesaid starch hydrolysate having a D. E. of zero to 20. While various starches can be used to make the starting starch hydrolysate, as a practical proposition corn and sorghum starches are most desirable, particularly waxy maize and waxy milo starches. The starch hydrolysate solids content of said aqueous solution is somewhat variable but, in general, it is desirably in the range of about 40 to about 60 percent, particularly advantageously about 55 to 58 percent, by weight of said solution. The lower solids concentration, in the aforesaid range, produce finished dried sweetener compositions having lower bulk densities than those obtained with the higher solids concentrations. With solids concentrations of about 55 to 60 percent and using a corn starch hydrolysate having a D.E. of 10 to 12, there are commonly obtained finished dried dipeptide sweetener compositions with a bulk density of the order of 0.05 to 0.1 g/cc, and with caloric contents of the order of 1 to 2 calories per level teaspoon. This starch hydrolysate solution is preferably made up at a temperature of about 50° C, with a range of about 30° C to 80° C, but this temperature may be somewhat higher, depending on the temperature of the solution or slurry of the aforesaid ester sweetener. At any rate, the mixture of the starch hydrolysate solution and the solution or slurry of the ester sweetener, which mixture is prepared just before entering it or its being fed into the preheater or preheaters of the spray dryer, should have a temperature that is between about 50° to 70° C, advantageously about 60° to 65° C. Between the time of preparing said mixture and the time that it is introduced or fed into the preheater or preheaters of the spray dryer, where drying is effected by means of a spray drier, only as short a period of time as is reasonably possible or practicable should be permitted to elapse. At most, only a few minutes, of the order of 3 to 5 minutes, should be permitted to elapse and, more desirably, such elapsed time should not exceed about 1 minute. The spray drying operation is initiated promptly and the spray drier is operated under conditions such that the moisture content of the finished, spray dried sweetener composition does not exceed about 4 percent and, more desirably, does not exceed about 1 percent, by weight of said finished composition. The exact manner of operating or controlling the spray dryer so as to obtain a finished spray dried product having the aforesaid moisture contents is variable, depending upon the exact construction of the dryer, temperature controls of inlet and outlet air and other factors which are, per se, well known to the art. In the preheater of the spray drier, the temperature of the mixture to be spray dried is rapidly raised, in a matter of several seconds, commonly about 5 to 15 seconds, to a temperature in the range of about 60° to 90° C or above, prior to the spraying into the drying chamber. By reducing the total solids content of the mixture of the starch hydrolysate and the dipeptide sweetener, preheating may be avoided but, as a practical proposition in general, it is especially advantageous to effect preheating and to effect drying in a spray drier in the manner and under the conditions described above.

While it is especially advantageous that the mixture of ingredients, made as described above and under the temperature and time conditions, be spray dried, in the broader aspects of the invention other drying equipment can be used such as vacuum drum driers, thin film driers and the like, rapid transfer to and rapid drying being an important desideratum. In the drying operation, an expanded dry pulverulent composition is obtained.

The starch hydrolysate constitutes a distinctly major proportion and the dipeptide sweetener constitutes a distinctly minor proportion of the aqueous slurry or solution, as the case may be, and, of course, of the total solids and of the final sweetener composition. The proportions of dipeptide sweetener utilized, although always distinctly minor, are variable, depending upon the sweetness characteristics of the particular dipeptide sweetener utilized and on the degree of sweetness desired in the final sweetening composition. In general, the dipeptide sweetener will usually fall within the range of 0.5 to 10 percent, particularly 2 to 5 percent, of the finished spray dried sweetener composition. The viscosities of the aforesaid aqueous compositions, as fed into the preheater or preheaters of the spray dryer, are variable, falling into the range of 50 to 1,000 cps as measured by a Brookfield Viscosimeter. The viscosities depend, of course, not only on the concentration of solids in the aqueous composition, for a particular starch hydrolysate and dipeptide sweetener, but also on the temperature of such aqueous composition or solution. Thus, in an illustrative case of an aqueous composition or solution containing 55 percent total solids, in which, on the total solids basis, the starch hydrolysate constitutes 95 percent and the dipeptide sweetener constitutes 5 percent the viscosity is about 300 cps at 37° C, about 100 cps at 50° C, and about 80 cps at 55° C.

While the nature of the dry, low calorie sweetener compositions with which our invention deals is believed apparent from the disclosures set forth above, the following are examples of illustrative aqueous compositions prior to drying the same in the manner and under the conditions hereinabove described. The percentages stated are by weight.

Example 1

| | |
|---|---|
| Milo starch hydrolysate (D.E. zero) | 38 |
| Aspartyl-phenylalanine methyl ester | 2 |
| Water | 60 |

Example 2

| | |
|---|---|
| Corn starch hydrolysate (D.E. 5) | 47.5 |
| Aspartyl-phenylalanine methyl ester | 2.5 |
| Water | 50 |

Example 3

| | |
|---|---|
| Corn starch hydrolysate (D.E. 12) | 57 |
| Aspartyl-phenylalanine methyl ester | 3 |
| Water | 40 |

Example 4

| | |
|---|---|
| Corn starch hydrolysate (D.E. 10) | 52.25 |
| Aspartyl-phenylalanine methyl ester | 1.65 |
| Sodium saccharin | 1.1 |
| Water | 45 |

Example 5

| | |
|---|---|
| Milo starch hydrolysate (D.E. 11.5) | 52.195 |
| Aspartyl-phenylalanine methyl ester | 1.65 |
| Calcium saccharin | 1.1 |
| Potassium sorbate | 0.055 |
| Water | 45 |

As indicated above, our sweetening compositions advantageously contain only the water-soluble starch hydrolysate and the aforesaid dipeptide sweetener. Supplemental ingredients can be added in small proportions, if desired, to the aqueous compositions prior to drying the same, to obtain special effects as, for example, sodium or calcium saccharins, cyclamates, edible gums, thickeners, stabilizers, surfactants, preservatives, flow conditioners, and the like. When reference is made in the claims to the compositions consisting essentially of the specified ingredients, it will be understood that this does not exclude the inclusion of small proportions of supplemental ingredients which do not fundamentally change the character of the low calorie sweetener compositions of our invention.

It has also been found that the dipeptide sweeteners tend to react with the starch hydrolysate to cause a slight discoloration of the finished dry pulverulent dipeptide sweetener composition, the extent of which varies with the temperatures to which the mixtures of the dipeptide sweetener and the starch hydrolysate are subjected and the length of time of contact therebetween. Generally, if optimum conditions under which the sweetener compositions of the present invention are prepared are observed, the discoloration is quite minimal. The discoloration can be substantially reduced by adding small proportions of hydrogen peroxide to the mixture of the starch hydrolysate and the dipeptide sweetener, or by adding glucose oxidase to said mixture, prior to the step of drying the mixture. This should be done under conditions such as not to substantially affect the D. E. of the starch hydrolysate.

The pulverulent free-flowing water-soluble low calorie sweetening compositions of our invention can be used, as are intended for use, in the same general way as sucrose for sweetening beverages and for various other food purposes for which sucrose is utilized.

We claim:

1. A method of preparing a dry pulverulent low calorie sweetener composition containing an aspartyl dipeptide lower alkyl ester of the formula

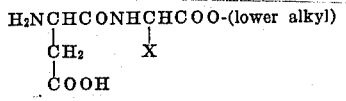

wherein X is selected from the group of radicals consisting of

and (CH$_2$)$_n$S(O)$_m$(lower alkyl)

R being a member of the group consisting of hydrogen and a lower alkyl radical, m an integer selected from the group consisting of 0 and 2 and n a positive integer less that three, which comprises a. preparing an aqueous starch hydrolysate solution having a D.E. up to 20 and having a temperature of about 30° to about 80° C, b. preparing a substantially concentrated aqueous solution or slurry of said ester having a temperature in the range up to about 40° C, c. admixing a minor proportion of the b. solution or slurry with a major proportion of the a. solution, and d. promptly drying the c. mixture to provide a dry pulverulent composition containing from 0.5 to 10 percent, by weight, of said ester, and not more than about 4 percent moisture.

2. A method of preparing a dry pulverulent low calorie sweetener composition containing an aspartyl dipeptide lower alkyl ester of the formula

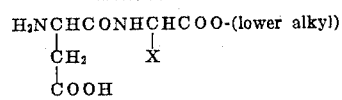

wherein X is selected from the group of radicals consisting of

and (CH$_2$)$_n$S(O)$_m$(lower alkyl)

R being a member of the group consisting of hydrogen and a lower alkyl radical, m an integer selected from the group consisting of 0 and 2 and n a positive integer less than three, which comprises a. preparing an aqueous starch hydrolysate having a D.E. up to 20 and having a temperature of about 30° to about 80° C, b. preparing a substantially concentrated aqueous solution or slurry of said ester having a temperature not exceeding about 40° C, c. admixing a minor proportion of the b. solution or slurry with a major proportion of the a. solution, said minor proportion being in an amount sufficient to provide in the final product from 0.5 to 10 percent, by weight, d. promptly feeding the c. mixture to a preheater of a spray dryer and thereupon spray drying said c. mixture to provide a dry pulverulent composition containing not more than about 4 percent moisture.

3. The method of claim 2 in which the starch hydrolysate is a sorghum starch hydrolysate having a D.E. in the range up to about 12.

4. The method of claim 2 in which the ester comprises from about 2 to 5 percent by weight of the dry sweetener composition.

5. The method of claim 2 in which the ester is aspartyl-phenylalanine methyl ester.

6. The method of claim 5 in which the starch hydrolysate is a sorghum starch hydrolysate having a D.E. in the range up to about 12.

7. The method of claim 5 in which the dry pulverulent composition is dried to a moisture content up to about 1 percent.

8. A sweetener composition made by the method of claim 1.

* * * * *